(12) United States Patent
Schumacher

(10) Patent No.: US 10,953,504 B2
(45) Date of Patent: Mar. 23, 2021

(54) BLANK HOLDER FOR A DENTAL MILLING MACHINE

(71) Applicant: vhf camfacture Aktiengesellschaft, Ammerbuch (DE)

(72) Inventor: Matthias Schumacher, Calw-Stammheim (DE)

(73) Assignee: vhf camfacture Aktiengesellschaft, Ammerbuch (DE)

( * ) Notice: Subject to any disclaimer, the term of this patent is extended or adjusted under 35 U.S.C. 154(b) by 354 days.

(21) Appl. No.: 15/874,751

(22) Filed: Jan. 18, 2018

(65) Prior Publication Data
US 2018/0200851 A1  Jul. 19, 2018

(30) Foreign Application Priority Data
Jan. 18, 2017  (DE) .................... DE102017000449.8

(51) Int. Cl.
| | | |
|---|---|---|
| *B23Q 3/06* | (2006.01) | |
| *B25B 5/04* | (2006.01) | |
| *A61C 13/00* | (2006.01) | |
| *B25B 5/08* | (2006.01) | |
| *B25B 5/12* | (2006.01) | |

(52) U.S. Cl.
CPC .......... *B23Q 3/062* (2013.01); *A61C 13/0022* (2013.01); *B25B 5/04* (2013.01); *B25B 5/08* (2013.01); *B25B 5/12* (2013.01); *B23Q 2703/10* (2013.01)

(58) Field of Classification Search
CPC .......... B23Q 3/06; B23Q 3/062; B23Q 3/065; B23Q 3/18; B23Q 3/183; B23Q 7/04; B23Q 7/047; B23Q 2703/00; B23Q 2703/02; H01L 21/68; H01L 21/682; H01L 21/687; H01L 21/68714; H01L 21/68721; B25B 11/02; B25B 5/08; B25B 5/12; A61C 13/12; A61C 13/00; A61C 13/0022; Y10T 409/303752
USPC .................................................. 269/287, 216
See application file for complete search history.

(56) References Cited

U.S. PATENT DOCUMENTS

| | | | | |
|---|---|---|---|---|
| 3,976,288 | A * | 8/1976 | Cuomo, Jr. ........... | B25B 11/005 269/21 |
| 7,042,238 | B2 * | 5/2006 | Tani ..................... | G01R 1/0433 324/756.02 |
| 9,593,430 | B2 * | 3/2017 | Yoshioka ................ | C25D 7/12 |
| 2002/0029963 | A1 * | 3/2002 | Yoshioka ............. | C25D 17/001 204/224 R |

(Continued)

*Primary Examiner* — Tyrone V Hall, Jr.
*Assistant Examiner* — Abbie E Quann
(74) *Attorney, Agent, or Firm* — Walter Ottesen, P.A.

(57) ABSTRACT

The invention relates to a blank holder for a dental milling machine. The blank holder has a clamping frame with a receptacle for a blank. The clamping frame includes a first frame part and a second frame part which are pivotable relative to one another to open the receptacle. A first clamping face is formed on the first frame part and a second clamping face is formed on the second frame part. The clamping faces engage an outer periphery of the blank with the clamping frame closed. To configure a blank holder so that the blank is fixed in the clamping frame in a play-free manner, provision is made to form one of the clamping faces on an annular clamping ring. The clamping ring is held on a frame part and is displaceable counter to a force in the axial direction.

19 Claims, 16 Drawing Sheets

(56) References Cited

U.S. PATENT DOCUMENTS

| | | | |
|---|---|---|---|
| 2002/0179408 A1* | 12/2002 | Lu | H01L 21/68 198/345.1 |
| 2009/0245983 A1* | 10/2009 | Law | H01L 21/68721 414/226.04 |
| 2011/0291343 A1 | 12/2011 | McMurtry et al. | |
| 2014/0237815 A1* | 8/2014 | Lau | H01L 21/68 29/834 |

* cited by examiner

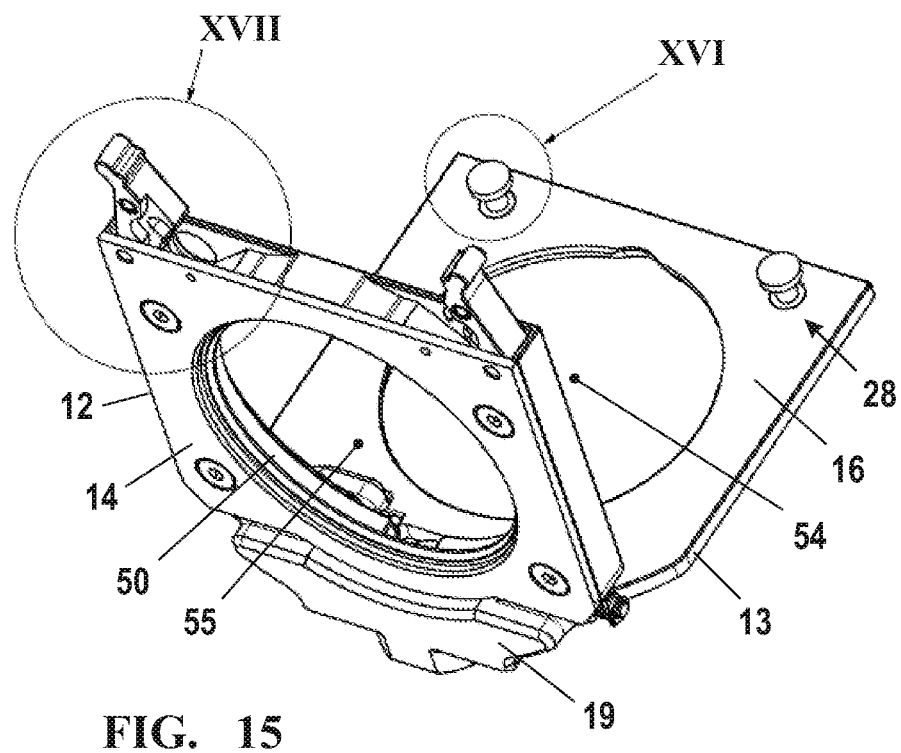
FIG. 15
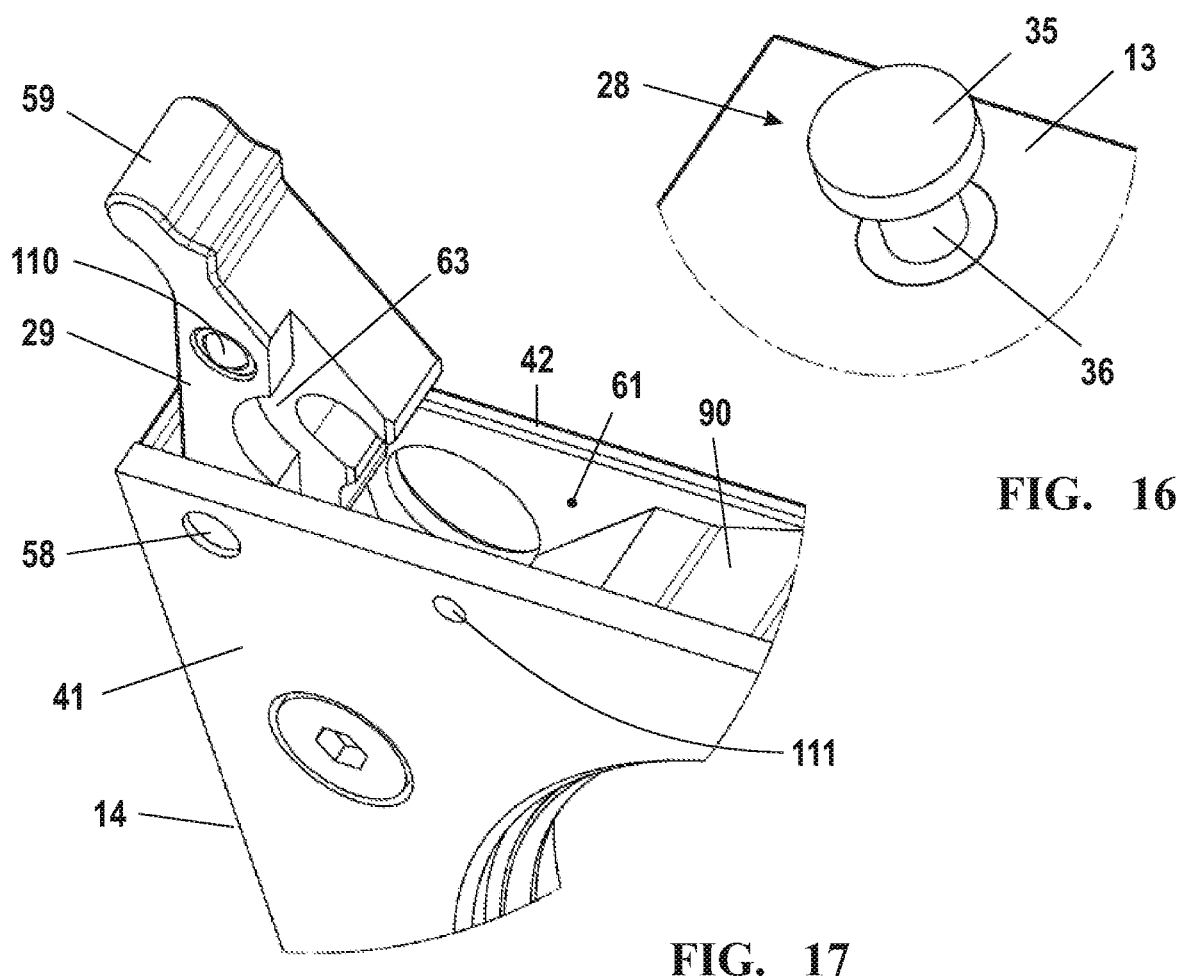
FIG. 16
FIG. 17

BLANK HOLDER FOR A DENTAL MILLING MACHINE

CROSS REFERENCE TO RELATED APPLICATION

This application claims priority of German patent application no. 10 2017 000 449.8, filed Jan. 18, 2017, the entire content of which is incorporated herein by reference.

BACKGROUND OF THE INVENTION

So-called blanks are disk-like slugs made of different materials for producing dentures, such as crowns, bridges or the like, for example. To this end, the required control data are provided to a dental milling machine by means of software, such that the denture can be milled out of the blank without any further intervention on the part of a user.

In order to hold a blank in the dental milling machine, blank holders which are intended to be used in particular in a tool-free manner are provided, into which a blank to be machined is intended to be introduced and fixed.

US 2011/0291343 A1 discloses a blank holder which allows a blank to be clamped in a tool-free manner. The clamping frame consists of a first frame part and a second frame part which are pivotable relative to one another in order to open the receptacle for the blank. To this end, the first frame part is connected to the second frame part in a pivotable manner in the region of a side edge of the clamping frame. In order to close the clamping frame, a U-shaped clamping lever is provided, which is held on the first frame part in an axially rotatable manner at its two side arms. The side arms have a guide slot for a pin which is held on the second frame part. As the clamping lever is pivoted about its bearing axis, the second frame part is moved, as a cover plate, onto the first frame part and fixed.

Because the closure device is formed from a pin guided in the guide slot of the clamping lever, increasing wear occurs, which results in an associated increasing level of play for the blank to move in the clamping frame. A possible movement of the blank in the blank holder can have a negative effect on the milling result. Also, in such a closure device, an only limited opening angle between the two frame parts is possible, with the result that the insertion of a disk-like blank into the blank holder is impeded.

SUMMARY OF THE INVENTION

It is an object of the invention to configure a blank holder for a dental milling machine in such a way that the held blank is fixed in the clamping frame in a play-free manner.

The blank holder of the invention is for a dental milling machine, wherein a blank held by the blank holder has an outer edge. The blank holder includes: a clamping frame having a receptacle for receiving the blank and the receptacle defining an axial direction; the clamping frame including a first frame component and a second frame component mounted so as to be pivotable relative to each other for opening the receptacle; the clamping frame having a lateral edge; the second frame component being pivotally connected to the first frame component in the region of the lateral edge to permit opening the receptacle; the first and second frame components having first and second clamping surfaces, respectively, for contact engaging the outer edge of the blank when the clamping frame is closed; a clamping ring held on one of the first and second frame components; one of the first and second clamping surfaces being formed on the clamping ring; the clamping ring having a height ($r$) measured in the axial direction; a positioning force device for applying a positioning force to the clamping ring; and, the clamping ring being mounted in the one frame component so as to be displaceable in the axial direction against the force applied by the positioning force device.

A first clamping face is formed on an annular clamping ring which is held on a frame part. The clamping ring has a height measured in the axial direction of the receptacle and is axially displaceable relative to the frame part, the clamping ring being subjected to an adjusting force in the axial direction.

If a blank is inserted into the receptacle of the clamping frame, a circumferential periphery of the blank comes to rest on the clamping face of the annular clamping ring. The circumferential periphery of the blank projects, in terms of its height, slightly above the upper plane of the first frame part, such that, when the clamping frame is closed, the second frame part comes to rest with a second clamping face on the circumferential periphery of the blank. The blank is pushed axially into the receptacle counter to the adjusting force of the clamping ring. As a result, the blank is held in a form-fitting manner in the axial direction between the first and second frame part, axially play-free holding being achieved on account of the axially displaceable clamping ring even after frequent blank changes. Blanks with different thicknesses can be clamped easily. A thickness tolerance of different blanks is compensated by the axial displaceability.

On account of the axial adjusting force, acting on the circumferential periphery of the blank, of the clamping ring, a friction fit is achieved which ensures a secure hold in the receptacle of the clamping frame even in the circumferential direction of the blank. The blank is held in an axially form-fitting manner between the clamping faces and is held between the clamping faces in a frictional manner in the circumferential direction. It may be expedient to provide a securing protrusion that projects radially into the receptacle on the first frame part, the securing protrusion engaging radially in the blank and securing the blank in a form-fitting manner in the circumferential direction.

Advantageously, the axial adjusting force acting on the clamping ring is provided by an energy store arranged between the frame part and the clamping ring. The energy store is configured in particular as a spring. Expediently, a helical spring is used.

The clamping frame is constructed in such a way that the first frame part forms a main body of the clamping frame, while the second frame part is configured as a pivotable cover plate. The main body of the clamping frame has, on a side edge, a coupling device for connecting the clamping frame to a workpiece carrier in the dental milling machine.

The main body of the first frame part consists substantially of a lower plate and an upper plate, the clamping ring acting between the lower plate and the upper plate. The coupling device may be formed integrally with the upper plate.

The clamping frame is expediently constructed such that the first frame part is connected to the second frame part by a pivot bearing formed on a side edge of the clamping frame, and at least one closure device for fixing the second frame part placed on the frame part is provided on the opposite side edge of the clamping frame. The coupling device is preferably located on the side edge of the main body on which the pivot bearings are also provided.

In the closed position of the closure device, the second frame part is locked to the first frame part in a form-fitting manner in the region of the side edge located opposite the pivot bearing. The closure device is configured such that, in the open position of the closure device, the first frame part is free of any mechanical connection to the second frame part by the closure device. In the region of the side edge located opposite the pivot bearing, there is no mechanical connection between the frame parts in the open position of the closure device. The second frame part configured as a cover plate can thus be pivoted into the open position without being impeded by the closure device itself. Advantageously, the first frame part is pivotable with respect to the second frame part such that the open clamping frame has an opening angle, formed between the first frame part and the second frame part, of up to 90° or more.

In a development of the invention, the closure device consists of a closure stud arranged on the second frame part and a closure lever held on the first frame part. In the closed position of the closure device, the closure lever engages under the closure stud, thereby achieving form-fitting locking.

The closure stud arranged on the second frame part will pass into a closure opening in the first frame part when the second frame part is pivoted onto the first frame part. The closure lever of the closure device is expediently held between the lower plate and the upper plate of the main body of the first frame part. In the closed position of the closure device, the closure lever is located in a receptacle between the lower plate and the upper plate of the main body.

BRIEF DESCRIPTION OF THE DRAWINGS

The invention will now be described with reference to the drawings wherein:

FIG. 15 shows a perspective illustration of a locking device of the blank holder with the clamping frame open;

FIG. 16 shows an enlarged illustration of the detail XVI from FIG. 15;

FIG. 17 shows an enlarged illustration of the detail XVII from FIG. 15;

DESCRIPTION OF THE PREFERRED
EMBODIMENTS OF THE INVENTION

Figure 1:
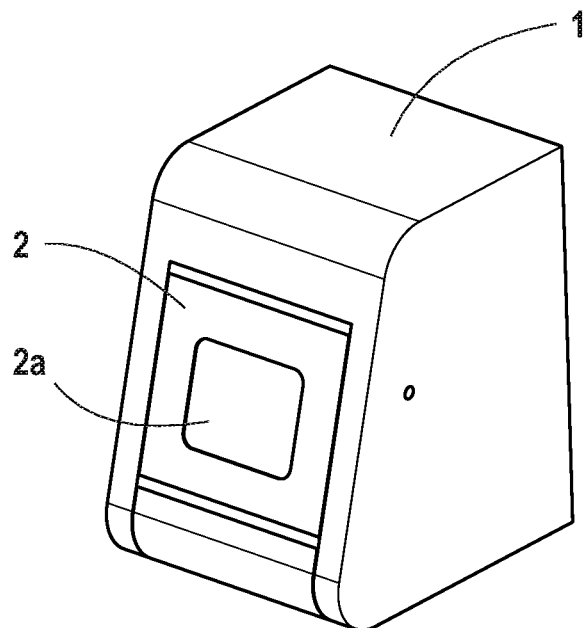
FIG. 1 shows a schematic view of a dental milling machine.
Figure 2:
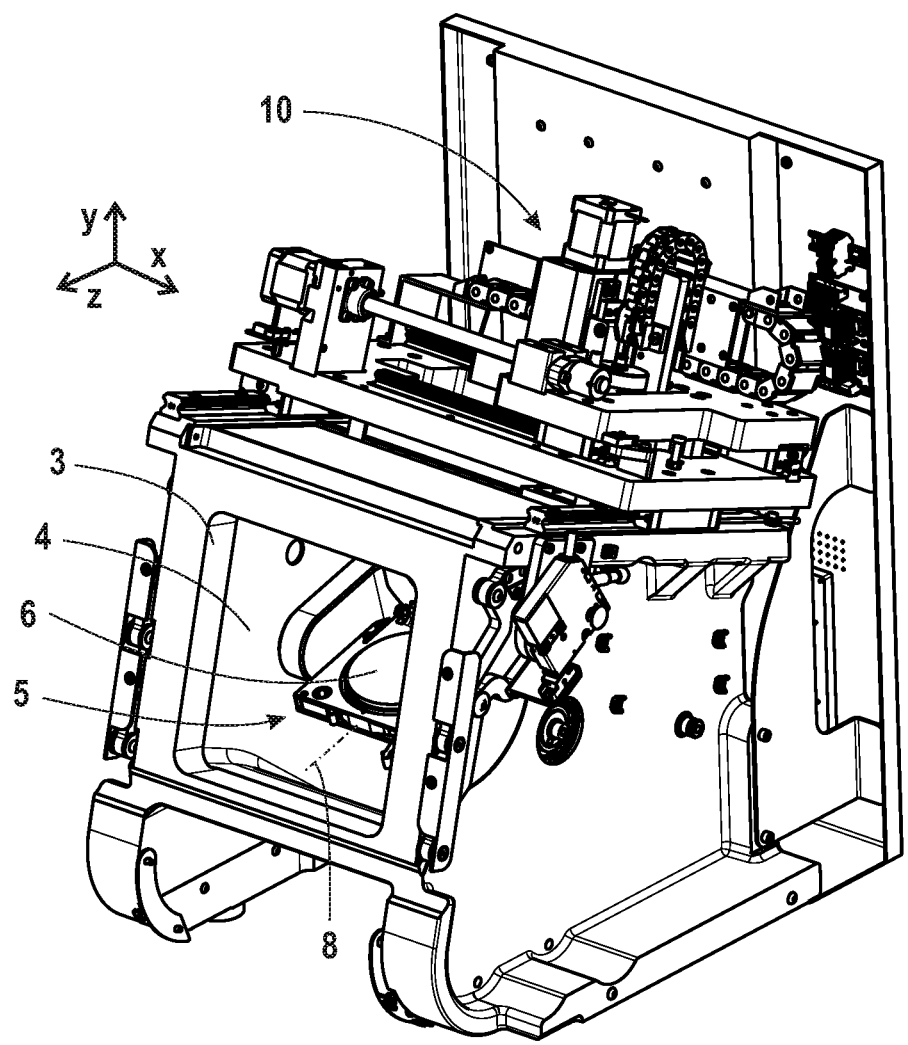
FIG. 2 shows the dental milling machine according to FIG. 1 with the housing removed.
Figure 3:
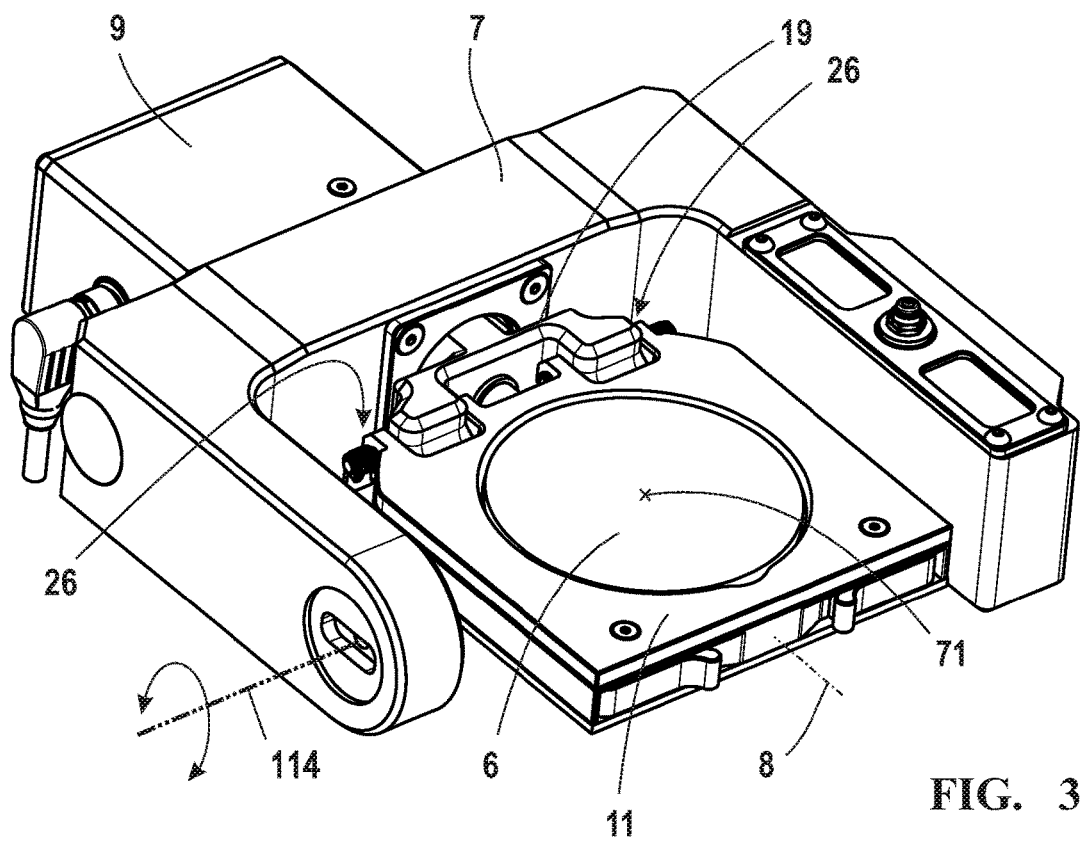
FIG. 3 shows a schematic view of a blank holder secured in a tool holder of the dental milling machine.

FIG. 1 perspectively illustrates a dental milling machine 1 which is provided for producing a denture, especially for manufacturing crowns and bridges. The dental milling machine 1 has a loading flap 2 with a window 2a. The loading flap 2 closes a loading opening 3 (FIG. 2) of the dental milling machine 1. After the loading flap 2 has been opened, the access to a working space 4 of the dental milling machine 1 is open in order to introduce or extract a blank holder 5 with a blank 6. The blank holder 5 is, as shown in FIG. 3, intended to be coupled to a workpiece carrier 7. The workpiece carrier 7 forms a pivot axis 114 about which it is advantageously possible to pivot upward and downward through +/−35°. The pivot axis 114 extends horizontally through the blank center 71. In this way, a 5th axis (B axis) is formed (FIG. 3). In the workpiece carrier 7, the blank holder 5 is intended to be rotated about a pivot axis 8 through 360° or more, as required, by a drive motor 9 (not illustrated in more detail) and an in particular play-free transmission.

The blank holder 5, held in the working space 4 in the workpiece carrier 7, with the blank 6 cooperates with a milling tool which is controlled via a milling drive 10. The milling drive is constructed such that the milling tool is able to be adjusted in all three spatial axes x, y, z, such that every point in the working space 4 can be approached by the milling tool. The fourth axis of machining is provided by the pivot axis 8 of the blank holder 5 held in a pivotable manner in the tool carrier 7. The 5th axis is formed by the pivot axis 114 which extends horizontally from left to right transversely through the machine and about which the blank holder is pivotable through especially +/−35°.

The blank holder 5 is reproduced on its own in particular in FIGS. 4 to 17. It includes substantially a clamping frame 11, which is made up of a first frame part 12 and a second frame part 13. The frame parts 12 and 13 bound and close a receptacle 15 (FIG. 12) which is intended for the insertion of a blank 6.

The first frame part 12 forms a main body 14 of the clamping frame 11; the second frame part 13 is configured as an especially pivotable cover plate 16. For working access of the milling tool to the blank, an in particular circular access opening 55 is provided in the first frame part 12; an access opening 54 is provided in a corresponding manner in the second frame part 13. Preferably, the axes of the access openings 54, 55 are located coincidentally with one another.

The first frame part 12 and the second frame part 13 are pivotable relative to one another in order to open and close the receptacle 15. As is also shown in the embodiment, a coupling device 18 is provided on a side edge 17 on the first frame part 12. The coupling device 18 consists of a fork-like carrier 19, the carrying legs 19a, 19b of which are connected rigidly to the first frame part 12 as main body 14. The carrying legs 19a, 19b have a height H which is greater than the thickness S of the clamping frame 11. The web 20, extending between the carrying legs, of the carrier 19 has, on its side facing away from the clamping frame 11, a carrying pin 21 which is intended to be clamped in a corresponding chuck of the workpiece carrier 7. The carrying pin 21 is advantageously formed by a cap screw, in particular an M8 cap screw. The cap screw is screwed directly into the A axis and ensures a secure connection between the blank holder 5 and a transmission. It is alternatively also possible to provide a chuck. A spring connection, which serves as a rotation lock, is provided at the flange between the carrier 19 and A axis.

The second frame part 13, provided as cover plate 16, is held in a pivotable manner on the carrying legs 19a, 19b of the carrier 19. To this end, pivot pins 22 are held in the carrying legs 19a and 19b, the pivot pins 22 passing through tabs 13a and 13b, engaging around the carrying legs 19a and 19b, of the second frame part 13. The second frame part 13 is thus held on the first frame part 12 so as to be pivotable about a pin axis 23.

Figure 4:
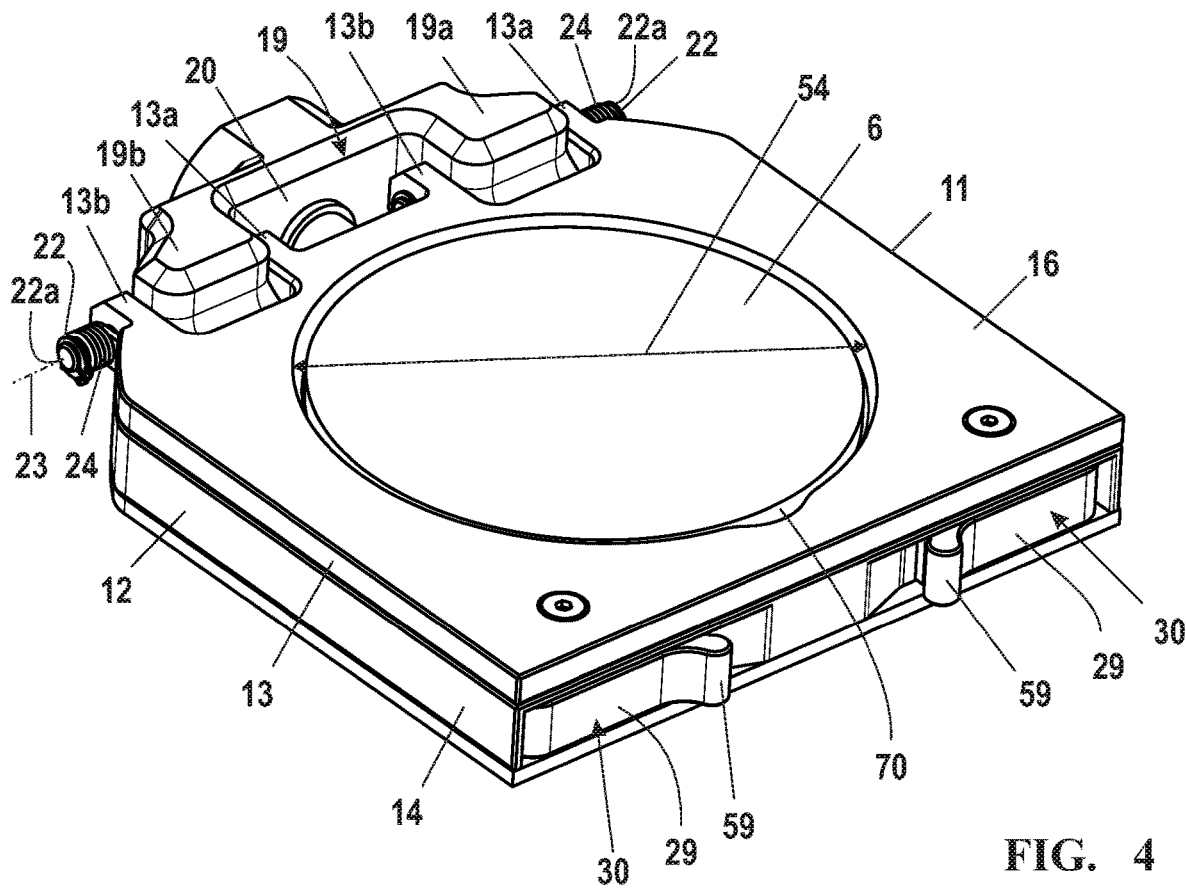
FIG. 4 shows a perspective view of the blank holder according to FIG. 3 with the clamping frame closed.
Figure 5:
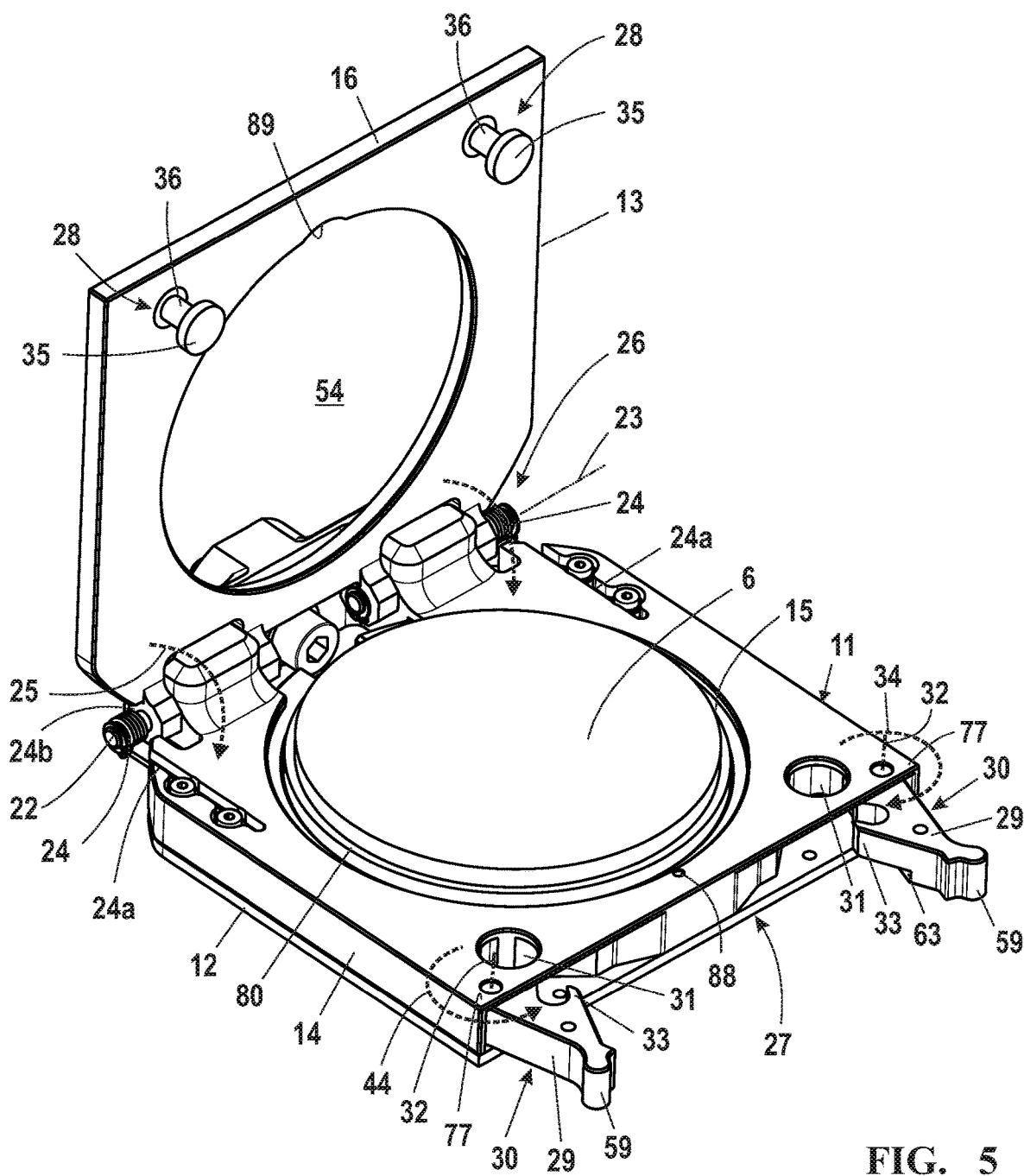
FIG. 5 shows a perspective view of the blank holder with the clamping frame open and a blank inserted in the receptacle.

As shown in FIGS. 4 and 5, a spiral spring 24 is threaded onto each pin end 22a. The spiral springs 24 are secured to the first frame part 12 with one end 24a and to the second frame part 13 with the other end 24b. The arrangement is made such that, when the clamping frame 11 is closed in the arrow direction 25, the spiral spring 24 is tensioned. The second frame part 13 is intended to be closed counter to an opening force of the spiral spring 24. The pivot pins 22 each form a pivot bearing 26 between the first frame part 12 and the second frame part 13.

Formed on the opposite side edge 27 of the clamping frame 11 from the pivot bearing 26 is a closure device 30 which is formed substantially from a closure stud 28 and a closure lever 29. The closure stud 28 is arranged on the second frame part 13; the closure lever 29 is held on the first frame part 12. The configuration is provided such that, when the second frame part 13 formed as a cover plate 16 is closed, the second frame part 13 is pivoted in the arrow direction 25 counter to a spring force, the closure stud 28 passing into a closure opening 31 in the first frame part 12. In the closed position according to FIGS. 6 to 8, the closure stud 28 is buried in the main body 14 of the clamping frame 11.

The closure lever 29 is held in the main body 14 of the clamping frame 11 so as to be pivotable about a pivot axis 32. The closure lever 29 has a closure claw 33 which, when the closure lever 29 is pivoted inward in the arrow direction 34 and 44, engages under the stud head 35 of the closure stud 28 and engages around the shank 36 of the closure stud 28. Provided on the underside of the stud head 35 is a shallow bevel which serves as an introduction slope for the closure lever 29. As a result, the axial clamping force is applied to the blank 6 in a slowly increasing manner through the action of the inclined plane. Formed in the center, around the shank 36, is a perpendicular annular face, which is at right angles to the stud axis. The clamping travel is limited to a maximum and the clamping levers can always be pushed in fully.

Figure 11:
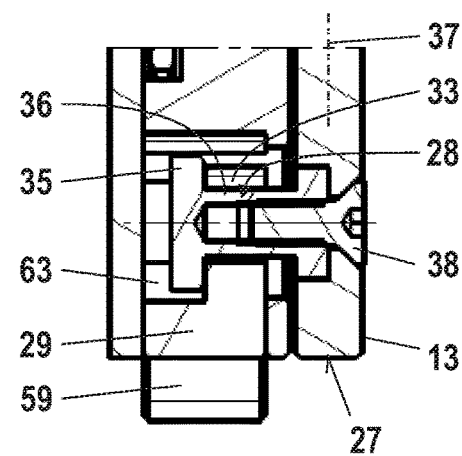
FIG. 11 shows a section along the line XI-XI in FIG. 6.
Figure 12:
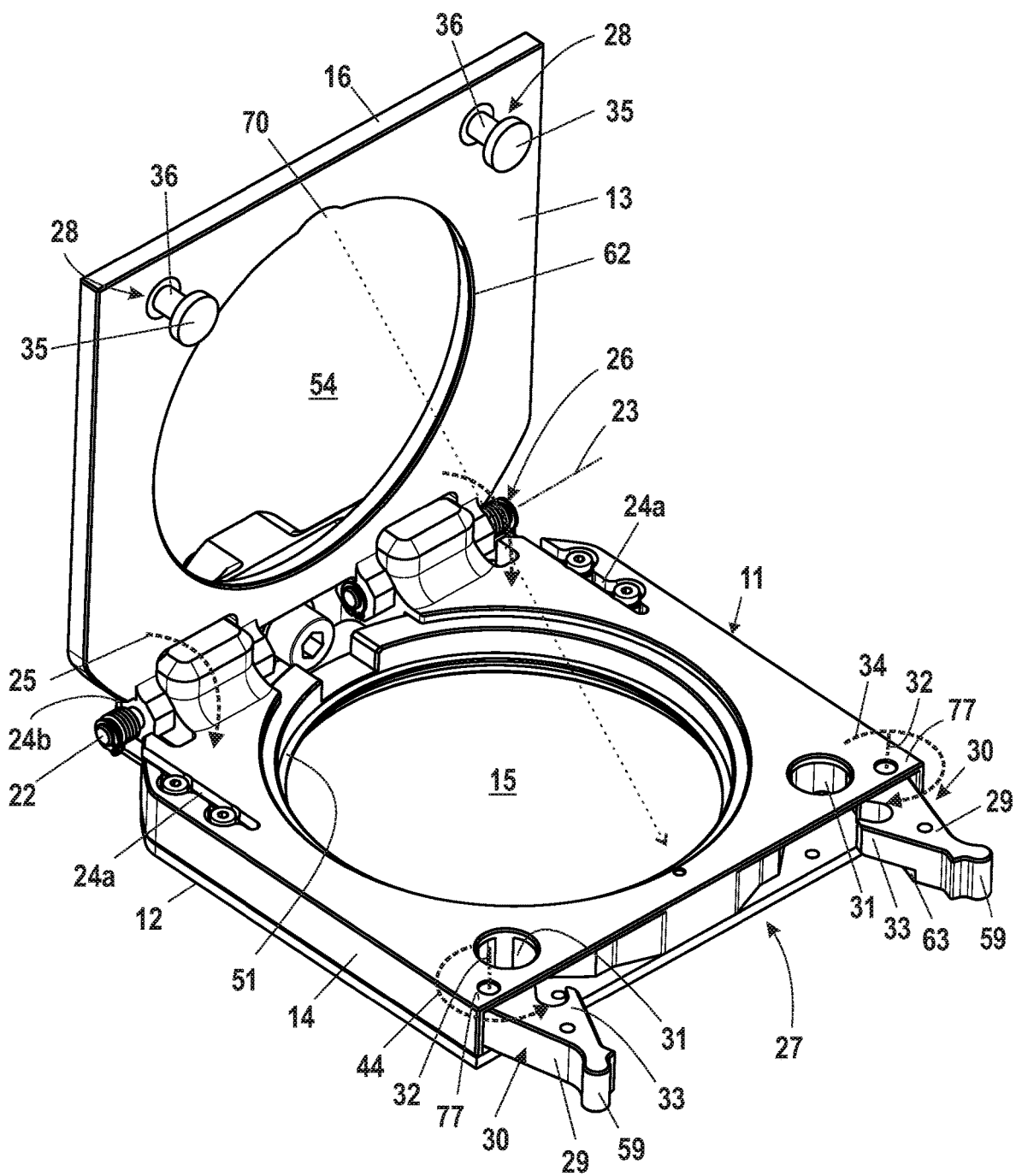
FIG. 12 shows a perspective illustration of a blank holder with the clamping frame open and without a blank.

The closed position of a closure device 30 is illustrated in section in FIG. 11. The closure stud 28 is perpendicular to the plane 37 of the second frame part 13 and is mounted on the latter by way of a fastening screw 38. The closure lever 29 engages around the shank 36 of the closure stud 28 by way of the closure claw 33. The closure claw 33 comes to lie beneath the stud head 35, such that the cover plate 16, or the second frame part 13, is locked to the first frame part 12 in a form-fitting manner.

Figure 6:
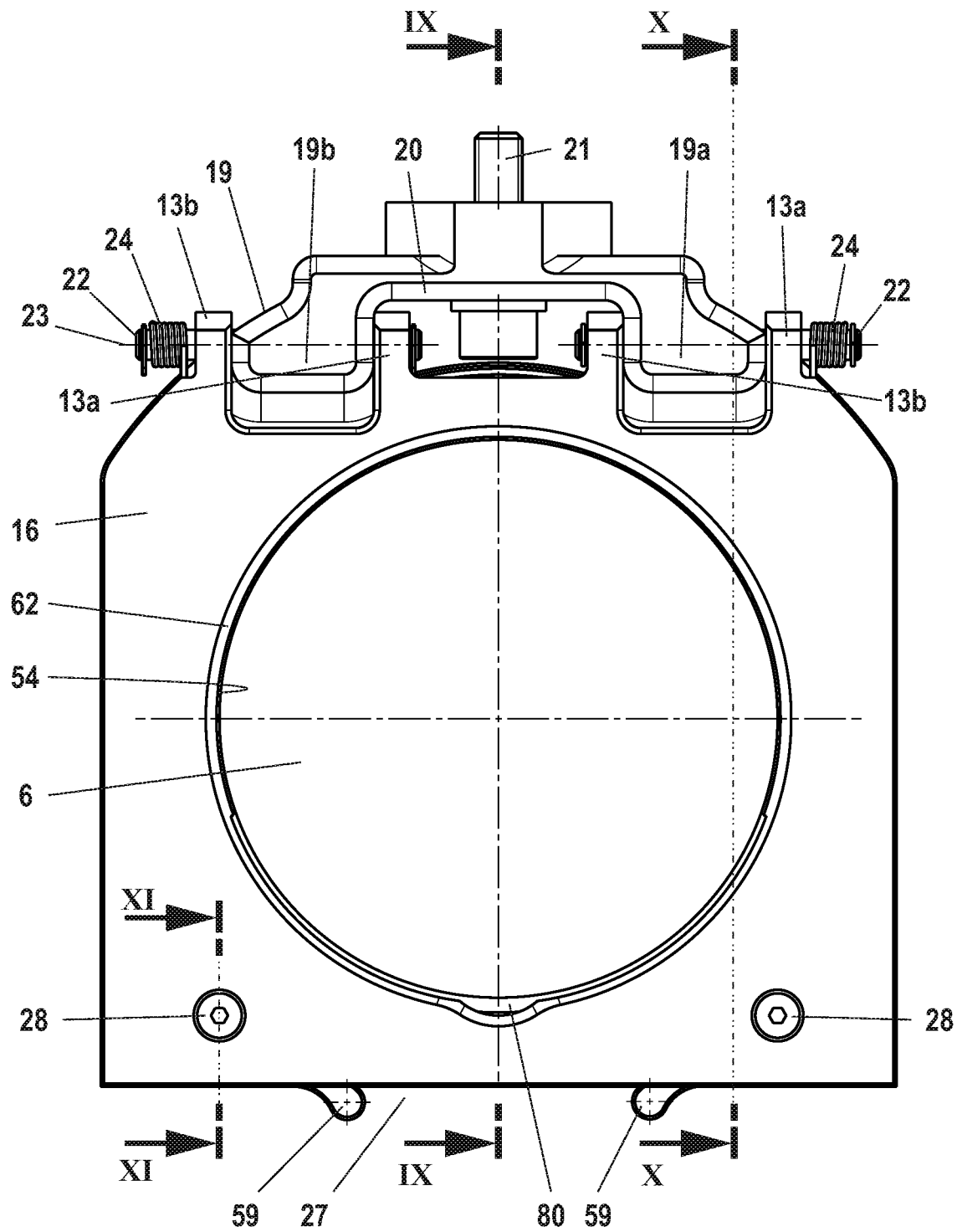
FIG. 6 shows a plan view of the blank holder according to FIG. 4.
Figure 7:
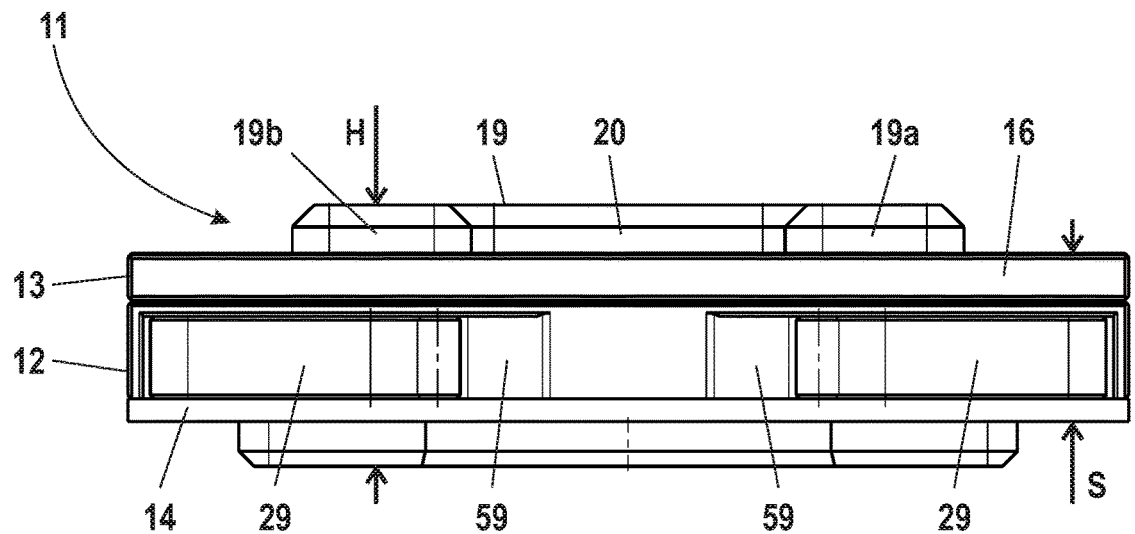
FIG. 7 shows a frontal view of the blank holder according to FIG. 6.

As FIGS. 5 and 6 show, a closure device 30 is formed in each corner region 77 of the side edge 27 of the main body 14, or of the first frame part 12. The arrangement is in this case made such that the pivoting movement, necessary for closing the closure device 30, in the arrow direction 34 of one closure device 30 is in the opposite direction to the pivoting movement, necessary in the arrow direction 44, of the closure lever 29 of the other closure device 30. The closing movements, necessary in the arrow directions 34 and 44, respectively, of the closure levers 29 are in opposite directions.

Figure 9:
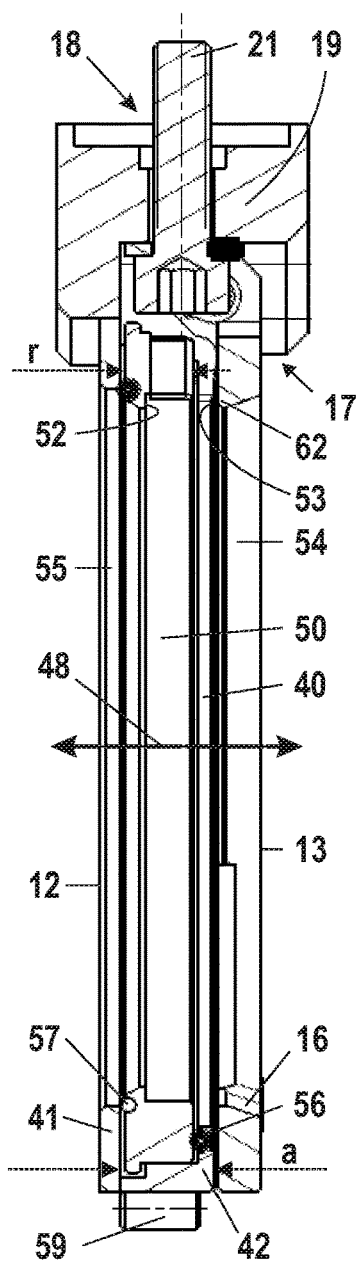
FIG. 9 shows a section along the line IX-IX in FIG. 6.
Figure 10:
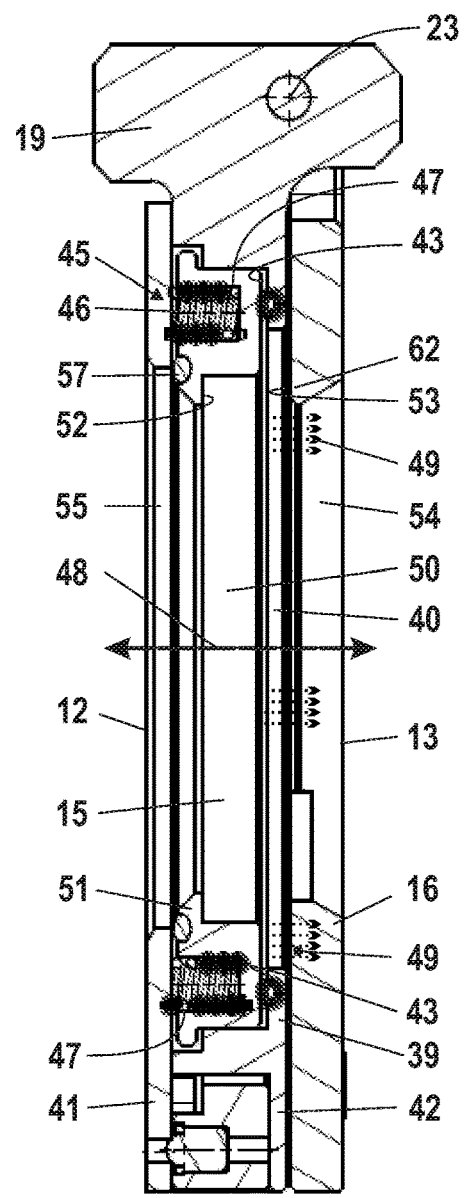
FIG. 10 shows a section along the line X-X in FIG. 6.

As in particular the sections according to FIGS. 9 and 10 show, the first frame part 12, forming the main body 14, consists substantially of a lower plate 41 and an upper plate 42. As shown in FIGS. 9 and 10, the upper plate 42 is formed as a three-dimensional body in one piece with the carrier 19. The upper plate 42 has an in particular circular access opening 40, the periphery 39 of which forms an annular face 43.

A clamping ring 50 bears against the annular face 43, the clamping ring being held captively in the receptacle 15 by the arrangement of the lower plate 41. Between the clamping ring 50 and the lower plate 41, an energy store 45 acts, which is configured, in the embodiment shown, as a spring, in particular as a helical spring 46. The spring is mounted in a blind hole 47 in the clamping ring 50. The spring, in the embodiment, the helical spring 46, thus acts between the clamping ring 50 and the lower plate 41 and exerts an adjusting force 49 on the clamping ring 50 in the axial direction 48. The clamping ring 50 thus bears against the annular face 43, bounding the access opening 40, of the upper plate 42 under the action of the adjusting force 49 of the energy stores 45.

The clamping ring 50 has a supporting periphery 51 which is formed in the foot region of the clamping ring 50, next to the lower plate 41. The supporting periphery 51 projects radially into the clamping ring 50.

The supporting periphery 51 forms a first clamping face 52 on the first frame part 12. The first clamping face 52 is located opposite—with regard to the axial axis of the receptacle 15—a second clamping face 53 which is provided on the second frame part 13 configured as a cover plate 16. The second clamping face 53 is formed by the periphery of an access opening 54 formed in the cover plate 16.

In a corresponding manner, the access opening 55 is formed in the lower plate 41, such that a blank 6 held in the receptacle 15 is accessible for machining from both axial end sides.

As FIGS. 9 and 10 furthermore show, a seal 56 is arranged preferably between the clamping ring 50 and the periphery 39 of the upper plate 42. A corresponding seal 57 is provided close to the access opening 55 in the lower plate 41. The seals 56, 57 are preferably ring seals, O-ring seals or similar seals.

The distance a, measured in the axial direction 48 of the access openings 54 and 55, between the annular face 43 (FIG. 10) of the upper plate 42 and the lower plate 41 is greater than the axial height r, measured in the same direction, of the clamping ring 50. As a result, the clamping ring 50 is movable axially between the upper plate 42 and lower plate 41, counter to the adjusting force 49 of the energy store 45.

Figure 13:
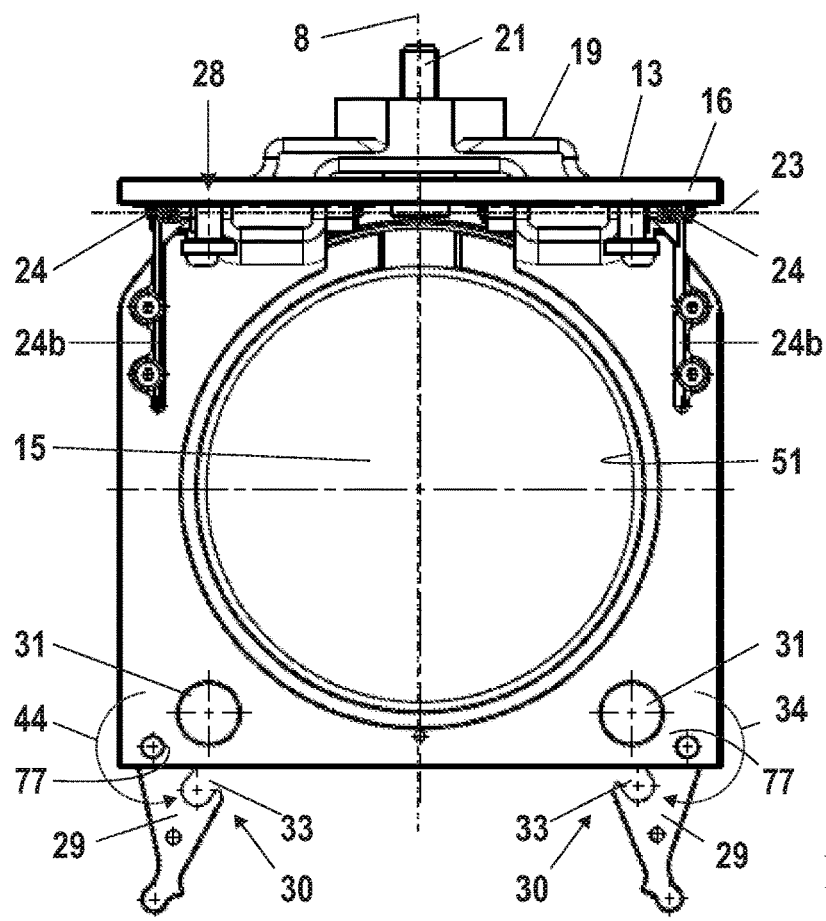
FIG. 13 shows a plan view of the open clamping frame according to FIG. 12.
Figure 14:
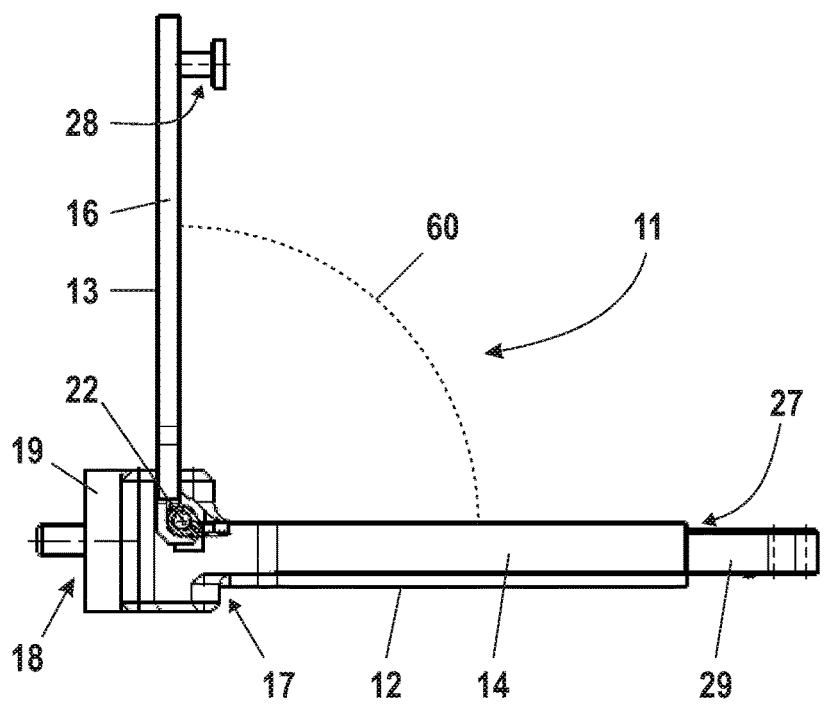
FIG. 14 shows a side view of the blank holder with the open clamping frame according to FIG. 12.

In order to load the blank holder 5, the clamping frame 11 is opened, to which end the closure levers 29 of the locking devices 30 are pivoted preferably in opposite directions counter to the arrow directions 34 and 44, respectively. Under the action of the opening force, counter to the arrow direction 25, generated by the spiral spring 24, the second frame part 13 configured as a cover plate 16 pivots upward and opens up the receptacle 15. As FIGS. 13 and 14 show, as a result of the configuration of the pivot bearing 26 in conjunction with the construction of the closure device 30, an opening angle 60 is possible which may be in the range up to 90°, and may in particular be even greater than 90°, up to 130°. As a result, it is easily possible to insert a blank 6 into the receptacle 15.

The closure device 30 is illustrated in detail in FIGS. 15 to 17. In FIG. 17, it is clear that the closure lever 29 is held in a pivotable manner between the upper plate 42 and the lower plate 41. The closure lever is mounted in the lower plate 41 and the upper plate 42 by way of a pivot pin 58.

Mounted in the closure lever 29 is a resilient ball thrust piece 110 which cooperates with a latching bore 111 in the lower plate 41. The ball thrust piece 110 engages in the latching bore 111 in the lower plate 41 in the closed state of the closure lever 29. As a result, the operator is informed by way of a click that the lock is closed; the lock cannot open by itself.

Figure 8:
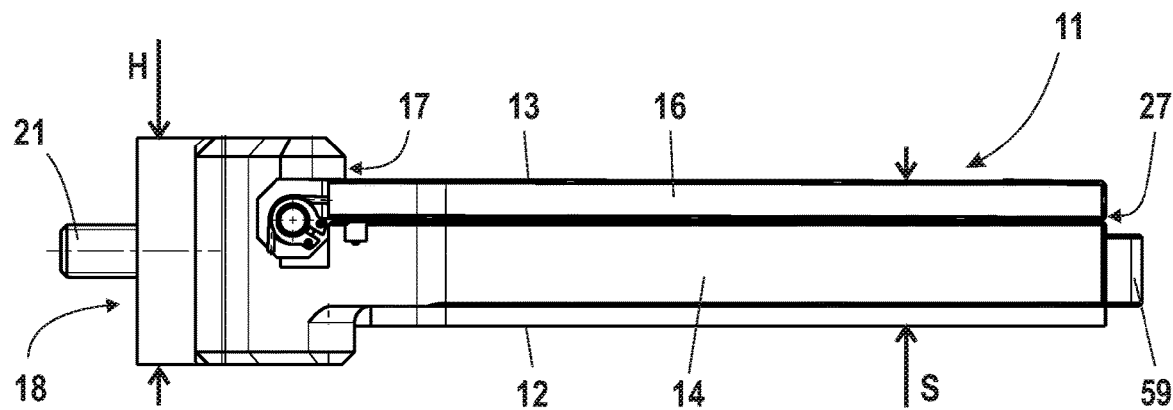
FIG. 8 shows a side view of the blank holder according to FIG. 6.

In the closed position according to FIG. 6, the closure lever 29 is located fully in a receiving space 61 of the main body 14. The receiving space 61 is bounded by the clamping ring 50 located behind a wall 90 of the upper plate 42, and by the upper plate 42 itself and the lower plate 41. In the closed position, a handle end 59 of the closure lever 29 projects beyond the side edge 27 of the clamping frame 11, as in particular FIGS. 6 and 8 show.

In may be advantageous, in order to orient the rotational position of a blank 6, to provide a marking or the like on the clamping frame 11. The marking 70 is advantageously a drill marking 88 in the lower frame part 12; other markings may also be practical. A cutout 89 is provided in the upper frame part 13, forming a cover, so that the marking is not concealed with the clamping frame 11 closed. It may be practical to provide a securing protrusion that projects radially into the receptacle 15 on the first frame part 12, the securing protrusion engaging radially in the blank 6 and securing the blank 6 in a form-fitting manner in the circumferential direction.

A blank 6 inserted into the receptacle 15 of the blank holder 5 has a periphery 80 (FIGS. 5, 6) which rests on the first clamping face 52 of the supporting periphery 51 of the clamping ring 50. When the cover plate 16 is closed, the opening periphery 62 of the access opening 54 engages over the periphery 80 of the blank 6, as can be readily seen from the plan view according to FIG. 6. When the clamping frame 11 is closed, as a result of a closure force being applied to the periphery 80, the latter is displaced, together with the clamping ring 50, counter to the adjusting force 49 of the energy stores 45, until the closure studs 28 of the closure devices 30 have passed into the closure openings 31 to such a depth that the closure levers 29 can be pivoted into their closed positions in the arrow direction 34, 44. In the closed position, the closure claw 33 is located beneath the stud head 35; the stud head 35 is located in a countersink 63 of the closure lever 29. The countersink 63 of the closure lever 29 is illustrated in particular in FIG. 17.

With the clamping frame closed, the blank 6 is held in an axially fixed manner; the blank 6 is fixed by the adjusting force 49 directed axially against the cover plate 16. In order to achieve a uniform adjusting force 49 that is sufficient for clamping, provision is made for a plurality of energy stores 45 to be arranged around the circumference of the clamping ring 50; in particular, three, in particular four or more energy stores 45 are provided around the circumference of the clamping ring 50. Energy stores 45 that are adjacent in the circumferential direction of the clamping ring 50 are expediently at equal distances from one another.

Figure 18:
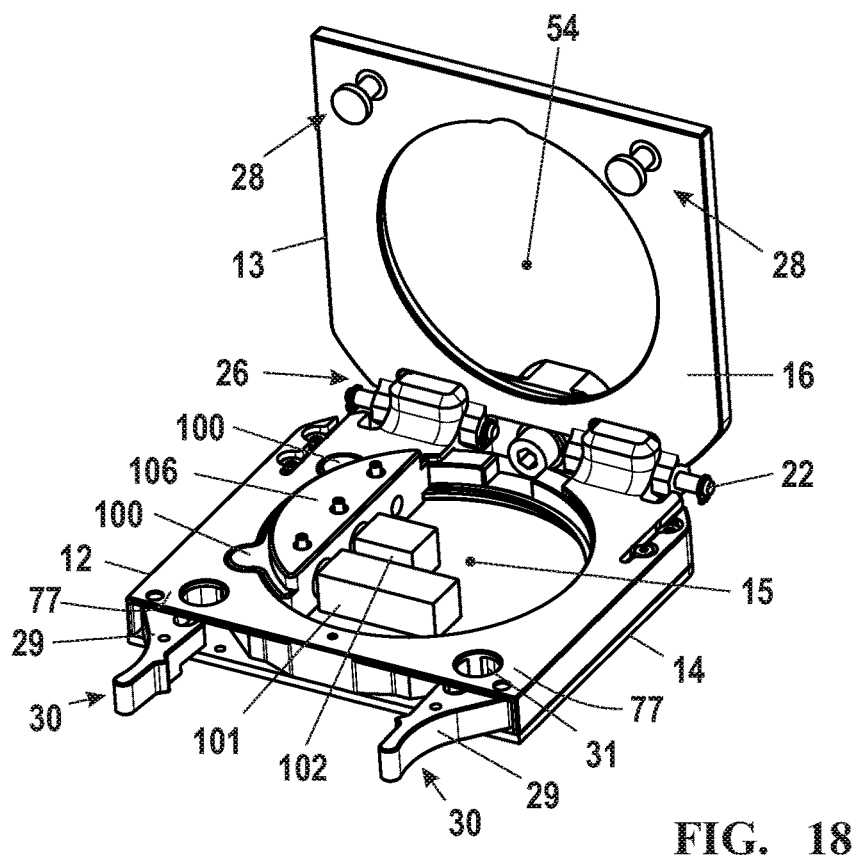
FIG. 18 shows a blank holder with the clamping frame open and an inserted adapter blank.
Figure 19:
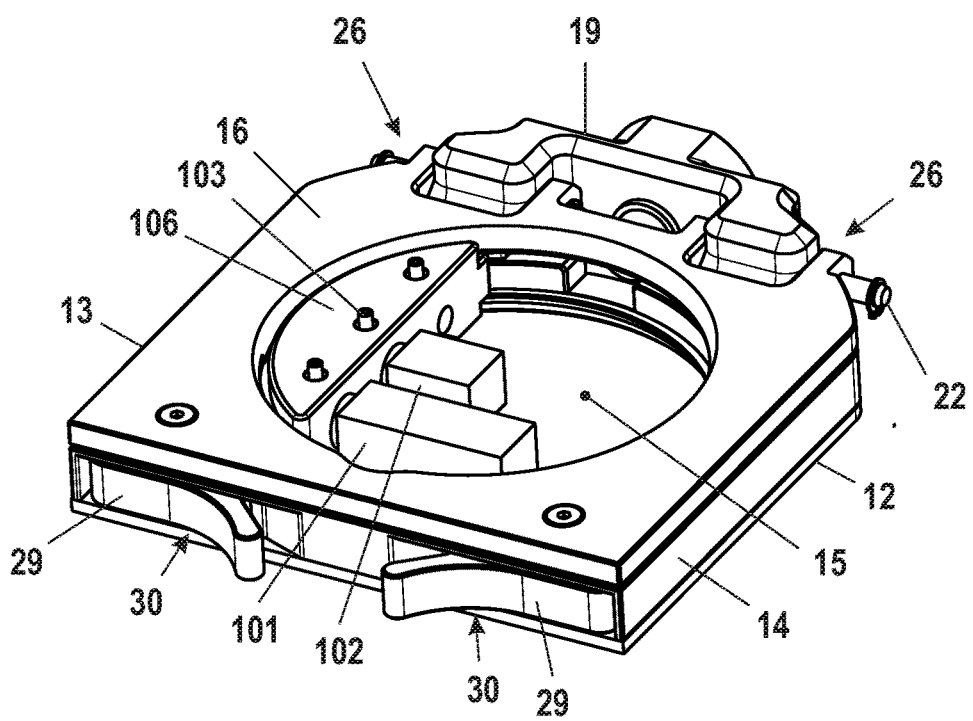
FIG. 19 shows a blank holder with the clamping frame closed and an adapter blank held therein.
Figure 20:
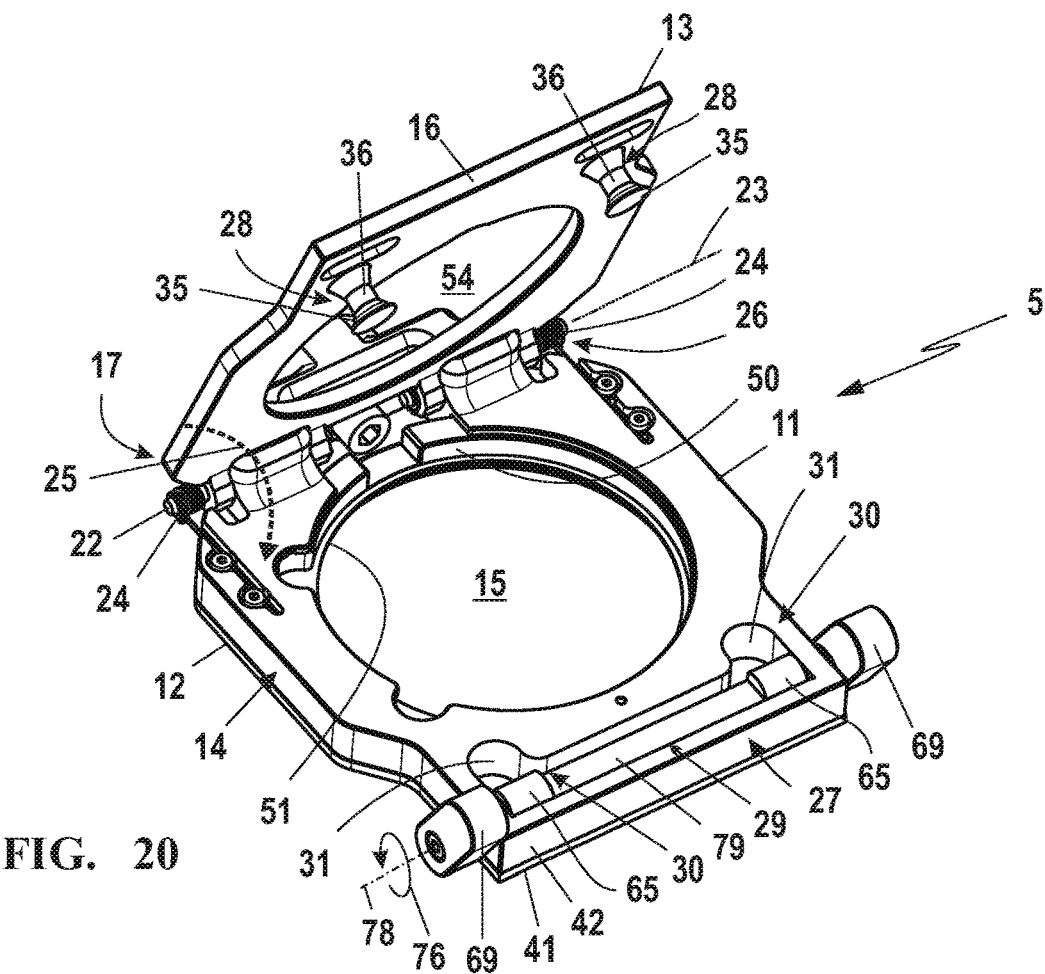
FIG. 20 shows a perspective view of a further embodiment of a blank holder with the clamping frame open and the closure device open.
Figure 21:
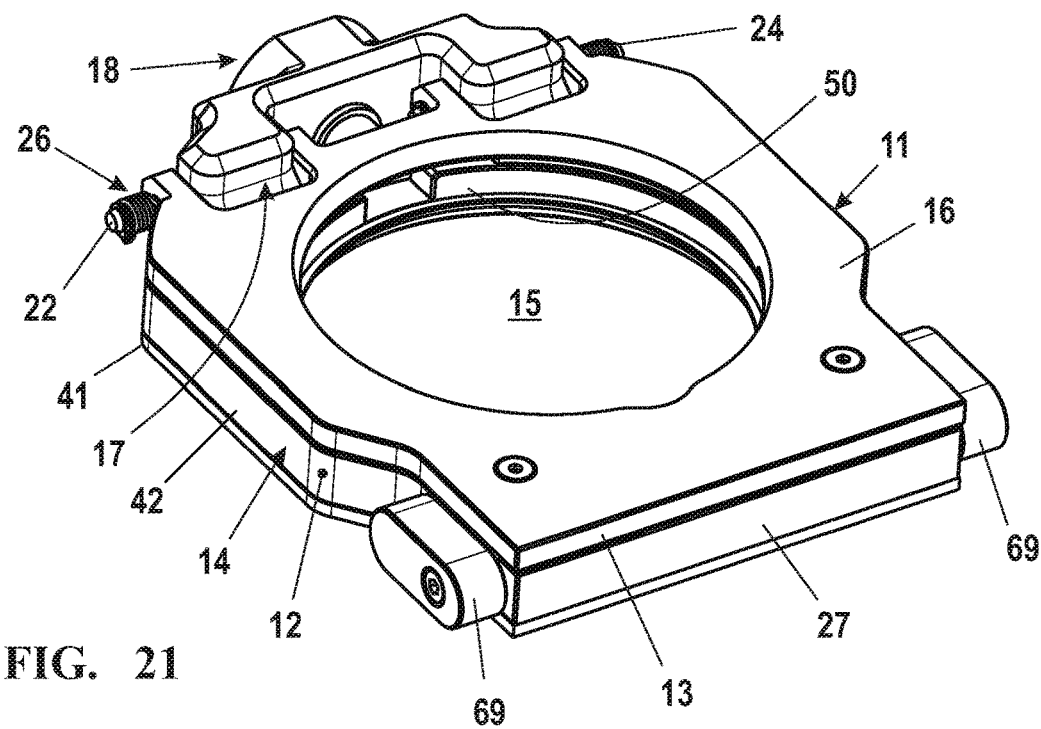
FIG. 21 shows a perspective view of the blank holder according to FIG. 20 with the clamping frame closed and the closure device locked.

In the embodiment shown in FIGS. 18 and 19, a blank holder 5 is illustrated which is modified compared to the embodiment according to FIGS. 1 to 17. Identical parts of the blank holder 5 according to FIGS. 18 and 19 are provided with the same reference signs as are used in the case of the blank holder 5 according to FIGS. 1 to 17. Instead of a blank 6, a blank adapter 106 is provided, which is inserted in a peripheral region of the receptacle 15. In order to fix the blank adapter 106 in the receptacle 15, two fixing protrusions 100 that are oriented radially with respect to the center of the receptacle 15 are provided, the fixing protrusions 100 engaging in corresponding peripheral recesses in the receptacle 15. On account of the fixing protrusions 100 oriented radially with respect to the center of the receptacle 15, the blank adapter 106 is held in a mechanically fixed manner in the periphery of the receptacle 15, such that a residual volume of the receptacle 15 remains free.

It may be expedient to form more than two peripheral recesses, in particular to provide four peripheral recesses which receive a circular blank adapter in a radially form-fitting manner.

The blank adapter 106 serves to hold cuboidal blanks 101, 102 which are fixed in a correct position in corresponding receptacles in the blank adapter 106 by means of screws 103. By means of the blank adapter 106, the blank holder 5 according to the invention can be used not only for cylindrical, disk-like blanks, but also for cuboidal blanks 101, 102 as workpieces.

FIGS. 20 to 29 illustrate a further embodiment of a blank holder 5 (FIG. 2) having a clamping frame 11. In terms of the structure of the clamping frame 11, the blank holder 5 corresponds to the one in FIGS. 4 to 14, for which reason identical reference signs have been used for identical parts.

The clamping frame 11 of the blank holder according to FIGS. 20 to 29 differs from the one described above by way of the configuration of the closure device 30. In the embodiment according to FIGS. 20 to 29, the closure device 30 consists of a closure lever 29 which is configured in the manner of a camshaft 79. In the embodiment shown, the camshaft 79 bears two closing cams 65, which cooperate, in particular in a form-fitting manner, with correspondingly configured closure studs 28 of the second frame part 13 configured as a cover plate 16.

If the cover plate 16 is pivoted onto the main body 14 in the arrow direction 25, the closure studs 28 engage in closure openings 31 in the main body 14. The closure lever 29 configured as a camshaft 79 is pivoted in the direction of rotation 76 about a pivot axis 78 in order to close the closure device 30. In the process, the closing cams 65 engage behind the stud head 35 of a closure stud 28, with the result that the cover plate 16 is locked in a form-fitting manner in its closed position.

The camshaft 79 is held in a rotatable manner between a lower plate 41 and an upper plate 42, the pivot axis 78 of the camshaft 79 extending parallel to the front side edge 27 of the main body 14. Respective handle levers 69 are secured to the ends 73 and 75 of the camshaft 79 (FIG. 22), the camshaft 79 being able to be rotated in the closing direction or in the opening direction by the user via the handle levers 69.

Figure 22:
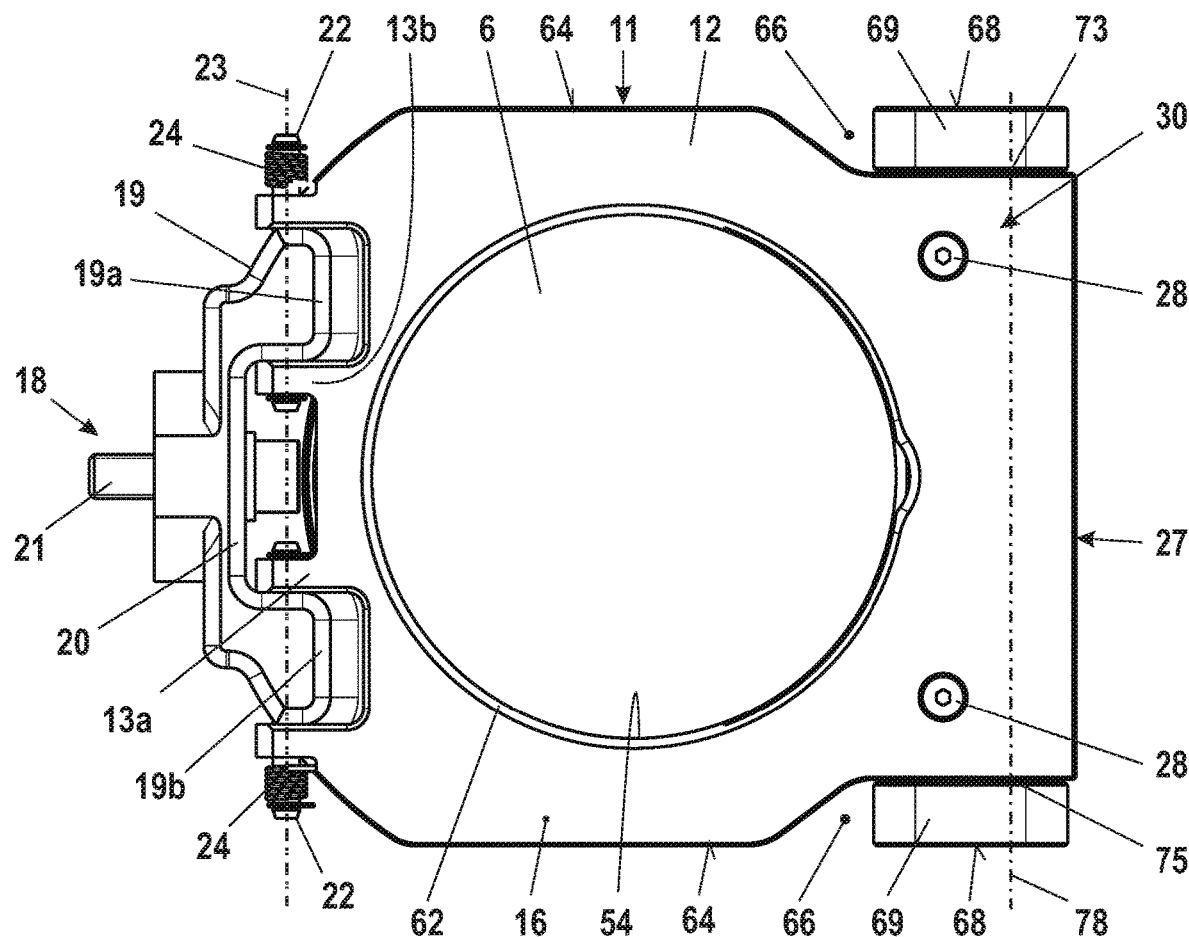
FIG. 22 shows a plan view of the blank holder according to FIG. 21 with the clamping frame closed and the closure device locked.

The main body 14—just like the cover plate 16—is configured such that, in the region of the handle levers 69, a free space 66 is formed in which the handle lever 69 is received preferably fully. The clamping frame 11 thus does not have any lateral protuberances; the end face 68 of a handle lever 69 lies—as the plan view according to FIG. 22 shows—in a plane with the side face 64 of the main body 14 of the clamping frame 11.

Figure 23:
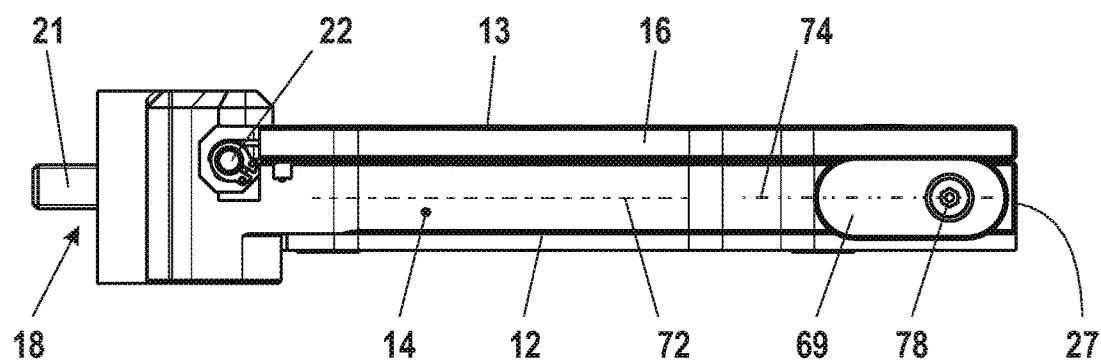
FIG. 23 shows a side view of the blank holder according to FIG. 22 with the clamping frame closed and the closure device locked.
Figure 24:
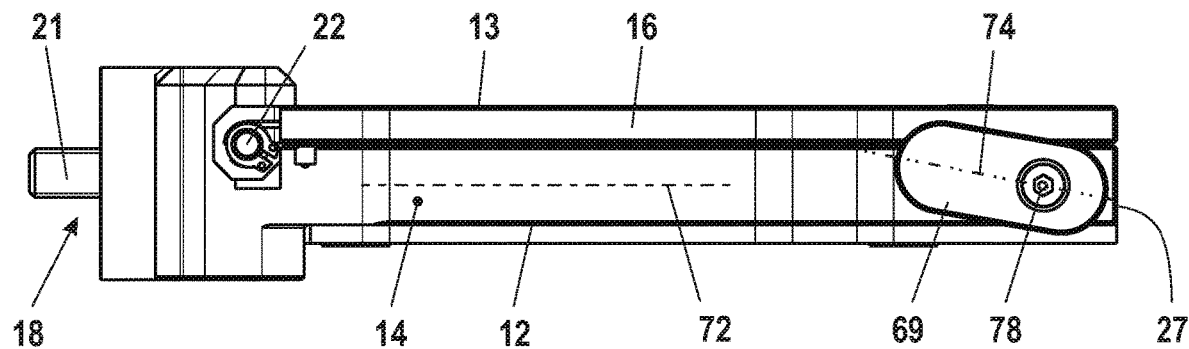
FIG. 24 shows a side view of the blank holder according to FIG. 23 with the clamping frame closed and the closure device partially locked.
Figure 25:
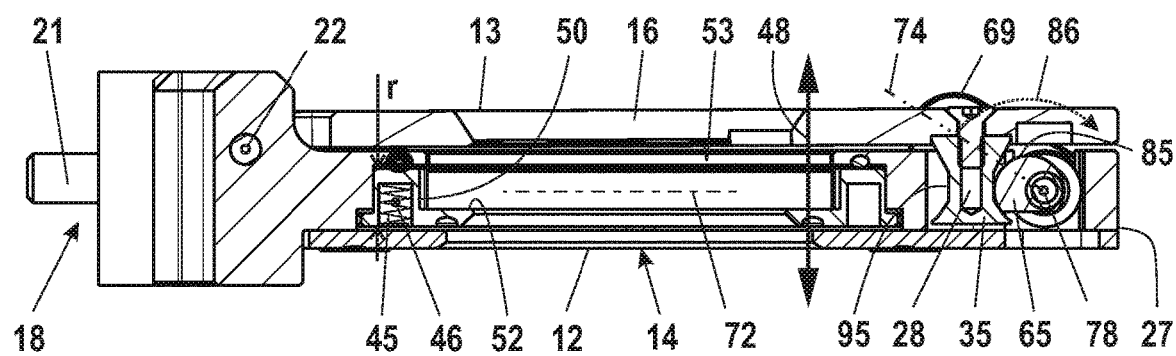
FIGS. 25 to 29 show side views of the blank holder according to FIG. 23 in different partially locked positions of the closure device right up to the open position.
Figure 26:
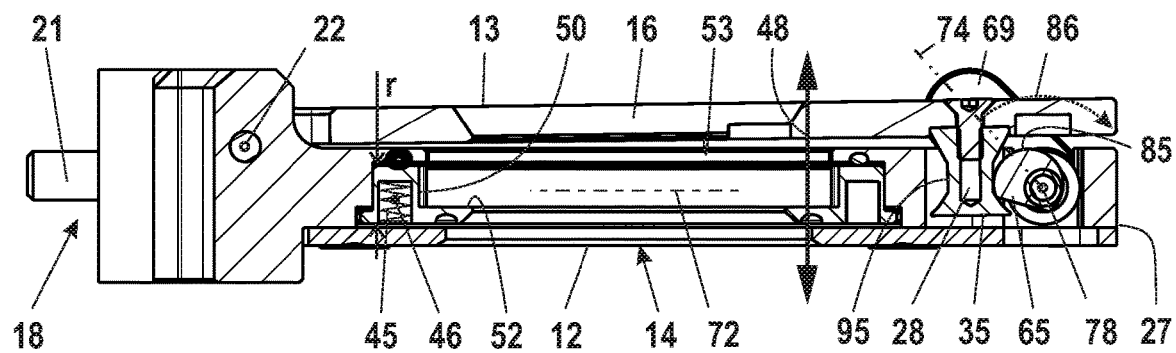
Figure 27:
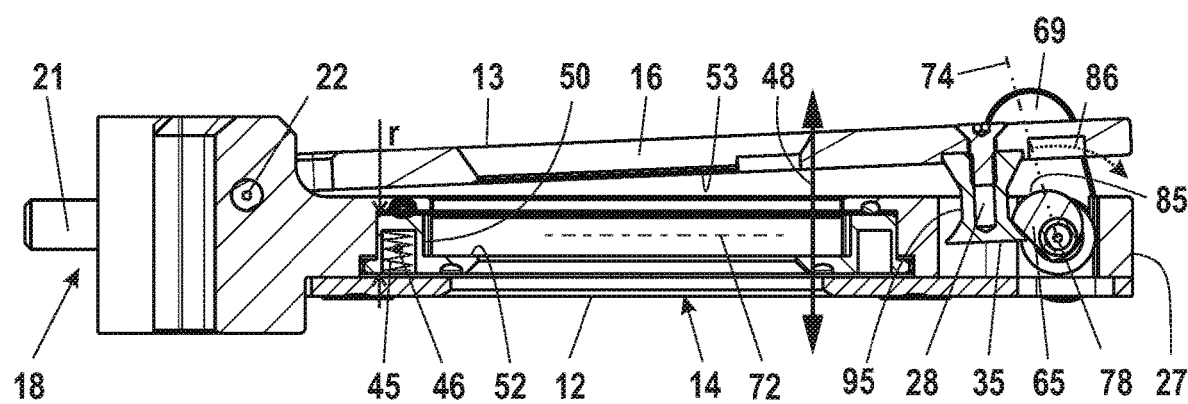
Figure 28:
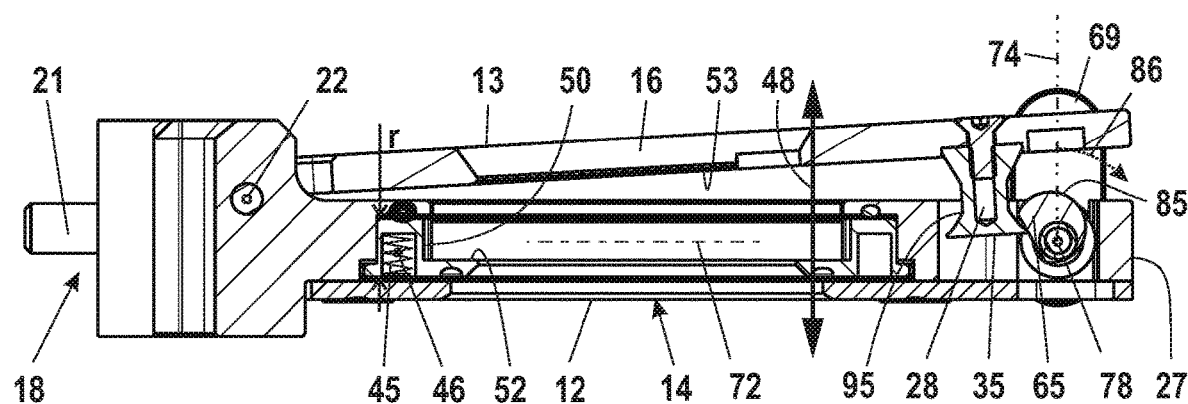
Figure 29:
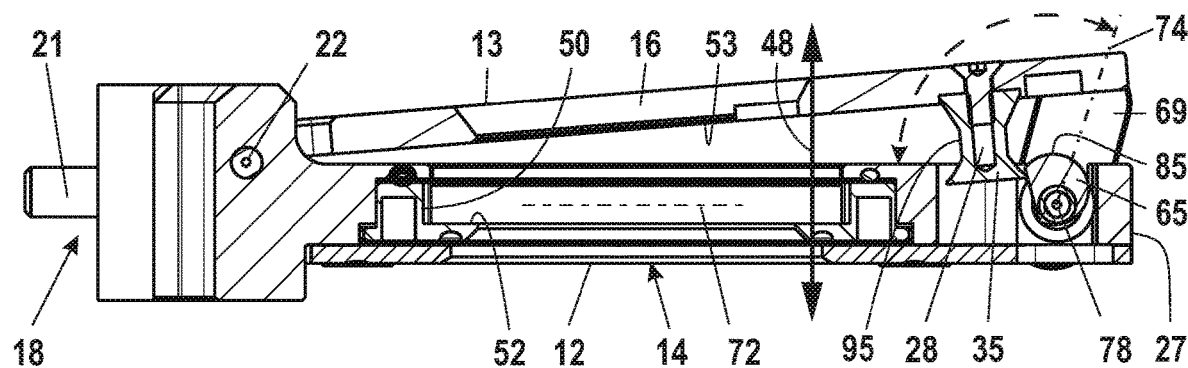

As is also illustrated in FIG. 23, in the closed position of the closure device 30, the handle lever 69 lies with its longitudinal axis 74 in the plane 72 of the main body 14. In this way, the user can visually see that the closure device 30 is in a closed position and proper locking of the cover plate 16 on the main body 14 has been ensured.

The opening of the clamping frame 11 is reproduced in steps in FIGS. 24 to 29. For opening, the handle lever 69 is pivoted in the direction of rotation 86, with the result that the camshaft 79 rotates about the pivot axis 78 together with the closing cams 65. The partially unlocked position, shown in FIG. 24, of the closure device 30 is illustrated in section in FIG. 25. The closing cam 65 continues to engage behind the stud head 35 of the closure stud 28. The contour 85 of the closing cam 65 is correspondingly adapted to the contour 95 at the circumference of the closure stud 28, such that, in the closed position according to FIG. 23, the contour 85 of the cam and the contour 95 of the closure stud rest against one another in a play-free manner. If the handle lever 69 is pivoted in the direction of rotation 86, the contour 85 of the closing cam 65 rotates further out of the contour 95 of the closure stud and frees up more of the stud head 35. The handle lever 69 is pivoted, via the position according to FIG. 27, into a position perpendicular to the plane 72 of the main body 14, in which position the contour 85 of the closing cam 65 is largely free of the stud head 35. In a rotated position of the handle lever 69 beyond the perpendicular position, the stud head 35 is freed up and the cover plate 16 is opened automatically under the action of the leg springs configured as spiral springs 24 (FIG. 22). The open position of the clamping frame 11 corresponds to the one shown in FIG. 14; the opening angle 60 of the clamping frame 11 is in particular 90°.

The closure device 30 according to the embodiment in FIGS. 20 to 29 comprises two closure studs 28 and two closing cams 65. The closing cams 65 are arranged on the common camshaft 79 and are adjusted jointly via the outer handle levers 69. If necessary, the user can adjust both closing cams 65 out of the open position according to FIG. 20 into the closed position according to FIG. 21 by actuating only one of the handle levers 69. The closing cams 65 simultaneously engage in the respectively associated closure stud 28 and engage behind the respectively associated stud head 35 in a form-fitting manner.

Figure 30:
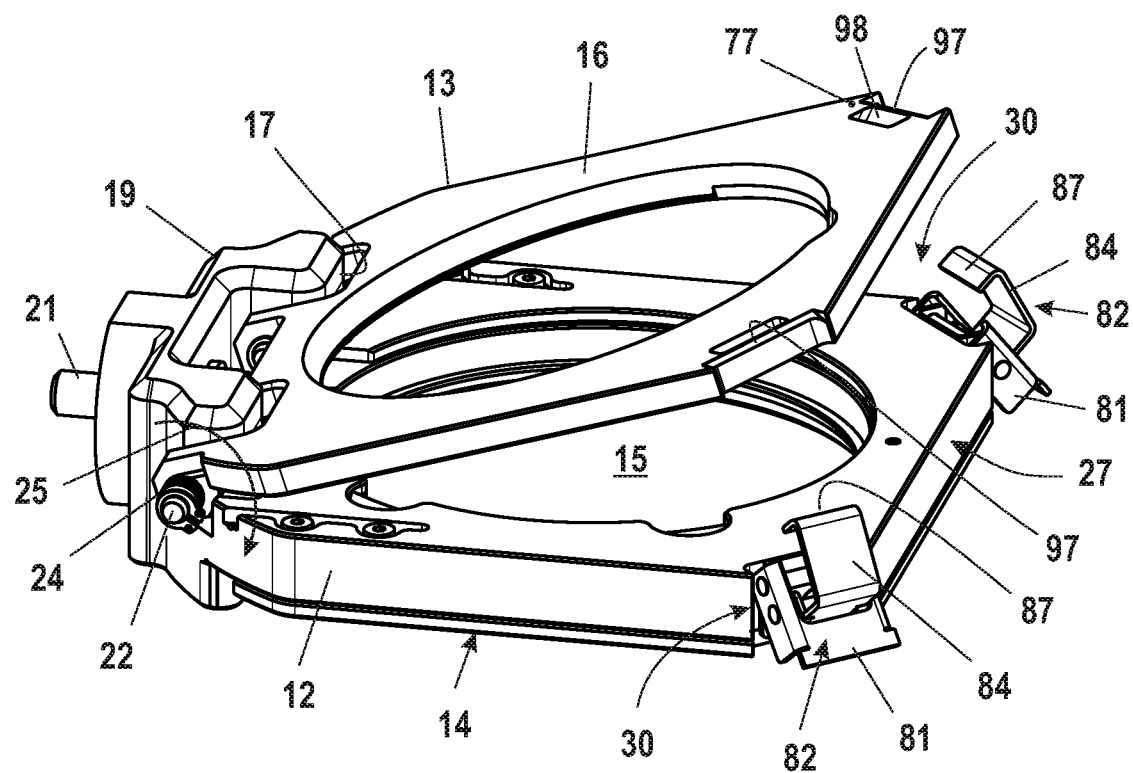
FIG. 30 shows a perspective view of a further embodiment of a blank holder with the clamping frame open and the closure device open, in an embodiment as a snap lock.
Figure 31:
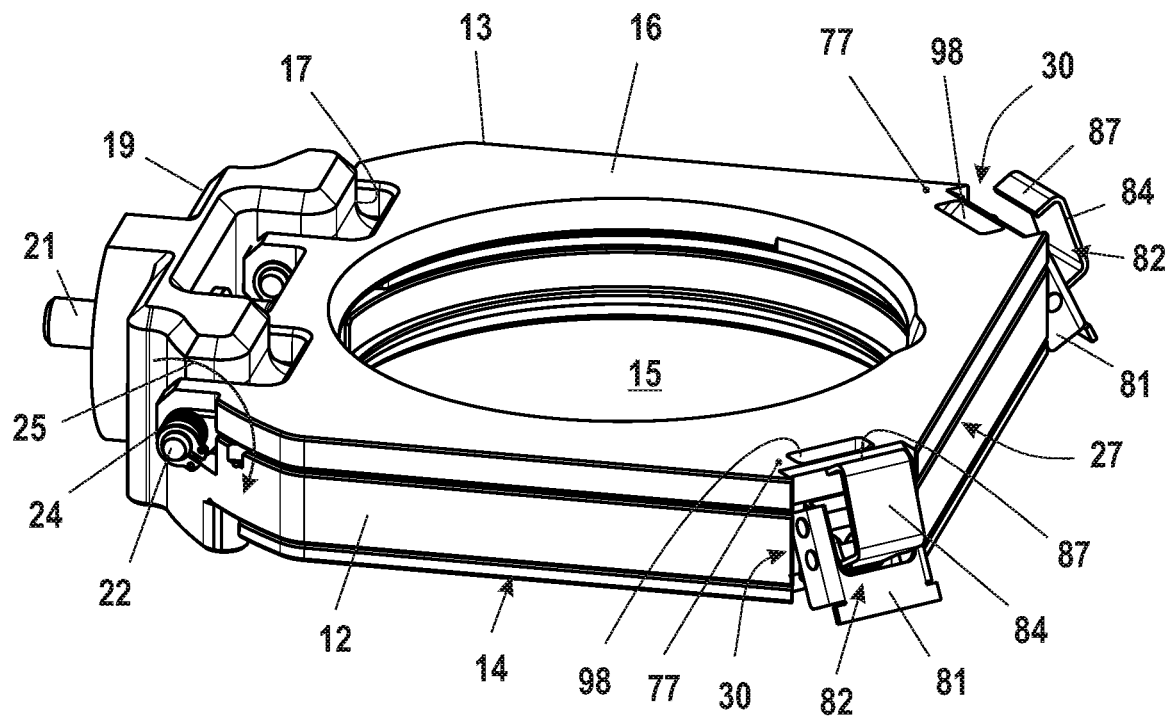
FIG. 31 shows a perspective view of a blank holder according to FIG. 30 with the clamping frame closed and the snap lock still open; and, FIG. 32 shows a perspective view of a blank holder according to FIG. 31 with the clamping frame closed and the snap lock closed.
Figure 32:
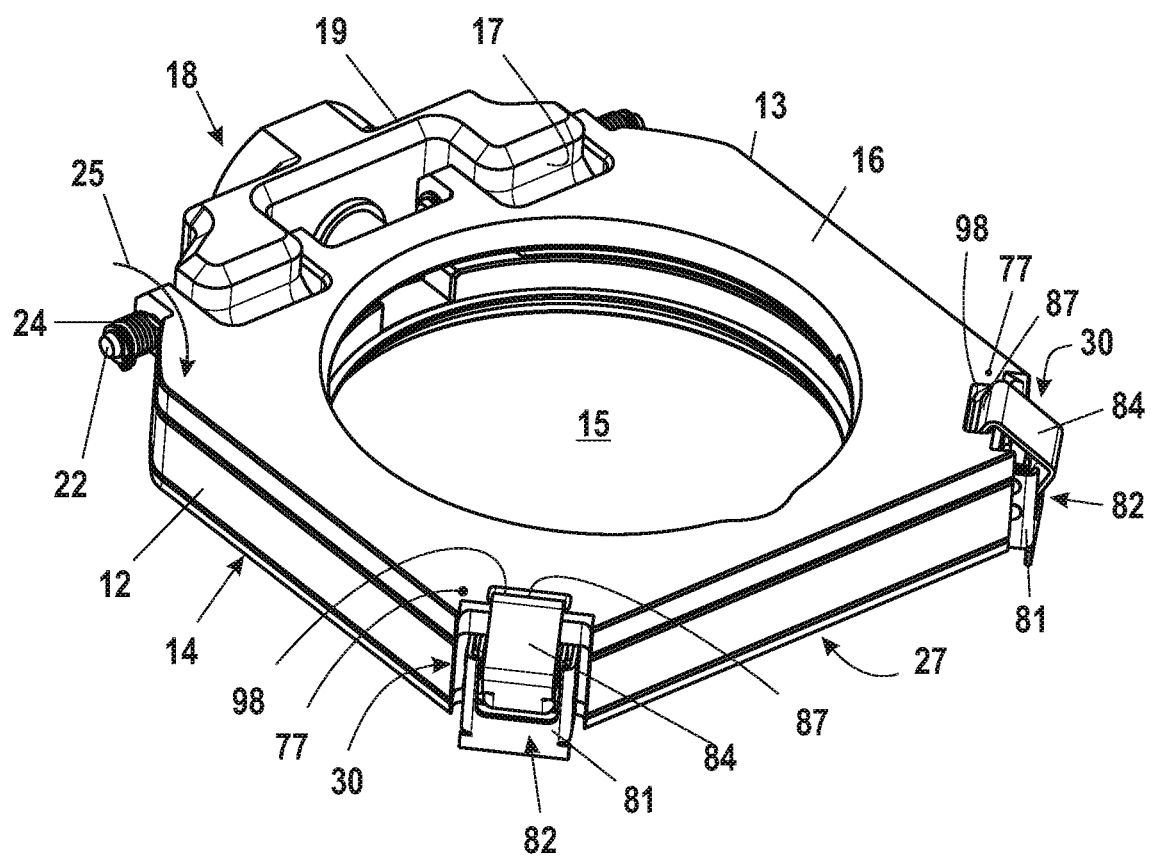

In the embodiment according to FIGS. 30 to 32, a snap lock 82 is provided as closure device 30. A snap lock 82 is arranged in each of the corner regions 77 of the front side edge 27 of the clamping frame 11. The arranged snap locks 82 are intended to be operated independently of one another. A snap lock 82 preferably forms a corner of the clamping frame 11.

Each snap lock 82 consists of a clamping claw 84 and a clamping-claw carrier 81 which is held in a pivotable manner on the main body 14 of the clamping frame 11.

In order to close the clamping frame 11, the cover plate 16 is flapped onto the main body 14 in the arrow direction 25 and is held in the closed position by the user. Then, the clamping-claw carrier 81 is pivoted upward until a gripping portion 87 of the clamping claw 84 engages over the corner periphery 97 of the cover plate 16. Preferably, a depression 98 for the engagement of the gripping portion 87 of the clamping claw 84 is provided in the cover plate 16. In the closed position of the snap lock 82, the gripping portion 87 is located in the depression 98 in a form-fitting manner.

When the gripping portion 87 of the clamping claw 84 is located in the depression 98 in the cover plate 16 of the clamping frame 11, the clamping-claw carrier 81 is pivoted into its closed position, as is illustrated in FIG. 32. In the closed position of the snap lock 82, there is a stable end position which reliably prevents the clamping frame from opening by itself.

It is understood that the foregoing description is that of the preferred embodiments of the invention and that various changes and modifications may be made thereto without departing from the spirit and scope of the invention as defined in the appended claims.

What is claimed is:

1. A blank holder for a dental milling machine, wherein a blank held by the blank holder has an outer edge defining a peripheral length, the blank holder comprising:
   a clamping frame having a receptacle for receiving the blank and said receptacle defining an axial direction;
   said clamping frame including a first frame component and a second frame component mounted so as to be pivotable relative to each other for opening said receptacle;
   said clamping frame having a lateral edge;
   said second frame component being pivotally connected to said first frame component in the region of said lateral edge to permit opening said receptacle;
   said first and second frame components having first and second clamping surfaces, respectively, for contact engaging said outer edge of said blank along all of said peripheral length thereof when said clamping frame is closed;
   a clamping ring held on one of said first and second frame components;
   one of said first and second clamping surfaces being formed on said clamping ring;
   said clamping ring having a height (r) measured in said axial direction;
   a positioning force device for applying a positioning force to said clamping ring; and,
   said clamping ring being mounted in said one of said first and second frame components so as to permit the entire clamping ring to be displaceable in said axial direction against the force applied by said positioning force device.

2. The blank holder of claim 1, wherein said one of said first and second frame components is said first frame component; and, said positioning force device has a force store mounted between said clamping ring and said first frame component.

3. The blank holder of claim 2, wherein the force store is a spring.

4. The blank holder of claim 3, wherein the spring is a helical spring.

5. The blank holder of claim 1, wherein said first frame component includes a base body of said clamping frame and said second frame component is configured as a pivotable closure cover.

6. The blank holder of claim 5, wherein said lateral edge is part of said base body and includes a coupling device for connecting to a tool carrier of said dental milling machine.

7. The blank holder of claim 5, wherein said base body of said first frame component includes a lower plate and an upper plate; and, said clamping ring is held between said lower plate and said upper plate.

8. The blank holder of claim 1, further comprising: a pivot bearing configured on said lateral edge of said clamping frame; said first frame component being connected to said second frame component via said pivot bearing; said lateral edge being a first lateral edge and said clamping frame having a second lateral edge lying opposite said first lateral edge; and, a closure device arranged on said second lateral edge.

9. The blank holder of claim 8, wherein said closure device is movable between a closed position when said second frame component is locked to said first frame component in a form-fitting manner and an open position when said first and second frame components are clear of any mechanical connection therebetween at said second lateral edge.

10. The blank holder of claim 8, wherein said clamping frame defines, when open, an open angle of up to 90° formed between said first frame component and said second frame component.

11. The blank holder of claim 9, wherein said closure device includes a closure stud mounted on said second frame component; and, a closure lever pivotably mounted on said first frame component so as to be pivotable to engage said closure stud in a form-tight manner in said closed position of said closure device.

12. The blank holder of claim 11, wherein said first frame component has a closure opening formed therein; and, said closure stud plunges into said closure opening when said closure device is moved into said closed position thereof.

13. The blank holder of claim 8, wherein said first frame component includes a base body; and, said closure device includes a closure lever pivotally mounted in said base body.

14. The blank holder of claim 13, wherein said base body has a lower plate and an upper plate; and, said closure lever is accommodated between said lower plate and said upper plate.

15. The blank holder of claim 13, wherein said closure lever is configured as a camshaft having at least one closing cam; and, said camshaft coacts with said second frame component in a form-fitting locking manner.

16. The blank holder of claim 15, wherein said closure device includes a closure stud mounted on said second frame component; and, said closure cam coacts with said closure stud in a locking manner.

17. The blank holder of claim 15, wherein said camshaft has first and second ends and passes through said base body of said clamping frame; and, first and second handle levers are arranged on corresponding ones of said first and second ends.

18. The blank holder of claim 17, wherein said base body defines a plane; and, said handle levers each define a longitudinal axis lying in said plane when said closure device is closed and perpendicular to said plane when said closure device is open.

19. The blank holder of claim 8, wherein said closure device is formed as a snap lock having a clamping claw; said snap lock is held on said first frame component; and, said second frame component has an edge and said clamping claw of said snap lock engages said edge of said second frame component when said closure device is closed.

* * * * *

UNITED STATES PATENT AND TRADEMARK OFFICE
CERTIFICATE OF CORRECTION

PATENT NO. : 10,953,504 B2
APPLICATION NO. : 15/874751
DATED : March 23, 2021
INVENTOR(S) : Matthias Schumacher Page 1 of 1

It is certified that error appears in the above-identified patent and that said Letters Patent is hereby corrected as shown below:

In the Specification

In Column 5:
Line 11: delete "coincidentally" and substitute -- coincidently --.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*